No. 857,910. PATENTED JUNE 25, 1907.
A. O. TATE.
APPARATUS FOR TREATING LIQUIDS ELECTROLYTICALLY.
APPLICATION FILED SEPT. 28, 1904. RENEWED FEB. 12, 1907.
2 SHEETS—SHEET 1.
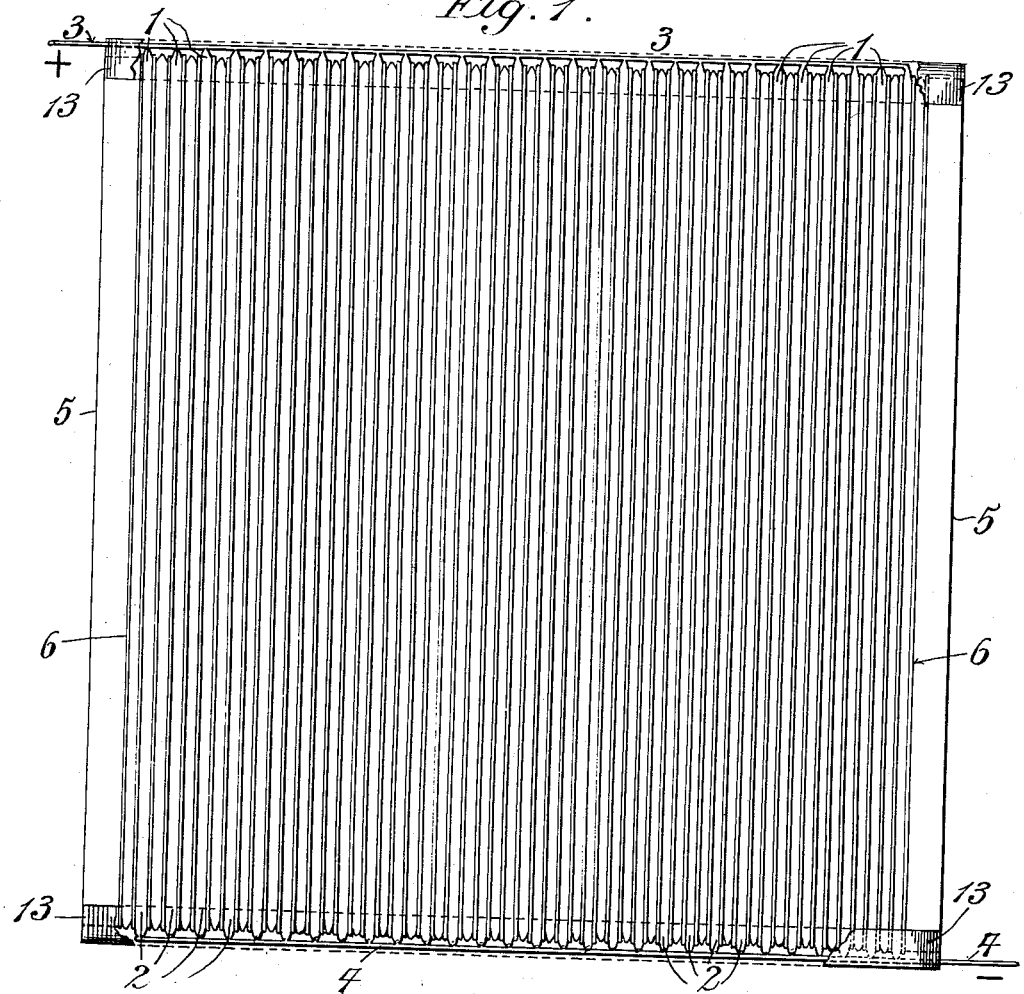
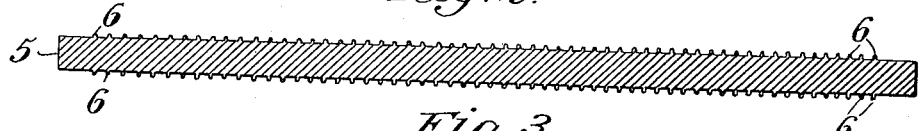
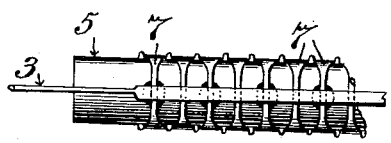
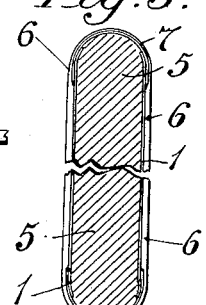
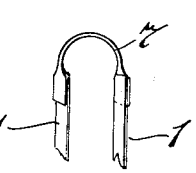
Witnesses
Edward Rowland,
M. F. Keating
Inventor
Alfred O. Tate
By his Attorney
Charles J. Kintner No. 857,910.
PATENTED JUNE 25, 1907.
A. O. TATE.
APPARATUS FOR TREATING LIQUIDS ELECTROLYTICALLY.
APPLICATION FILED SEPT. 28, 1904. RENEWED FEB. 12, 1907.
2 SHEETS—SHEET 2.
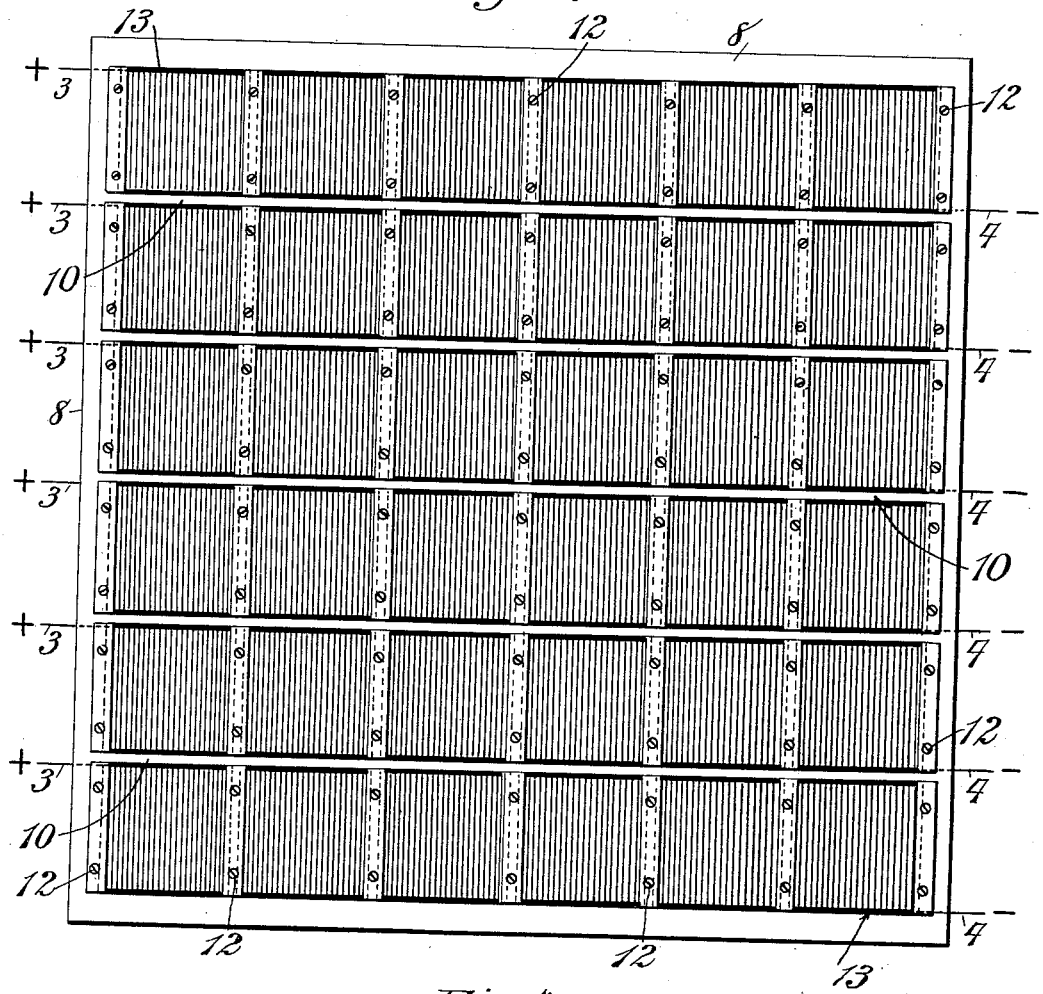
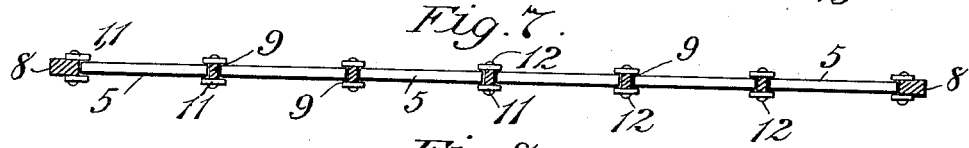
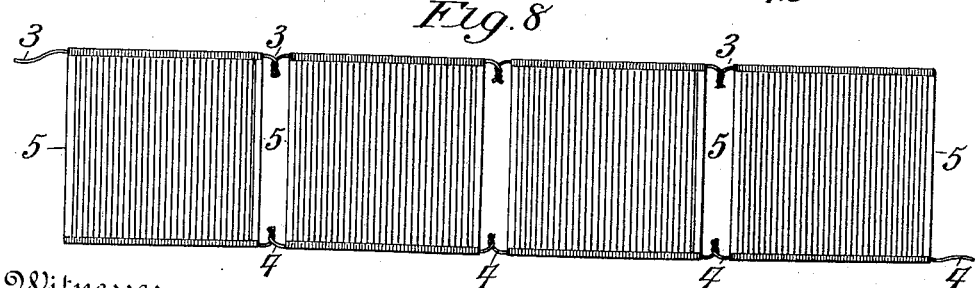
Witnesses
Edward Rowland
M. F. Keating
Inventor
Alfred O. Tate
By his Attorney
Charles J. Kintner

UNITED STATES PATENT OFFICE.

ALFRED O. TATE, OF NEW YORK, N. Y.

APPARATUS FOR TREATING LIQUIDS ELECTROLYTICALLY.

No. 857,910.          Specification of Letters Patent.          Patented June 25, 1907.

Application filed September 28, 1904. Renewed February 12, 1907. Serial No. 357,059.

*To all whom it may concern:*

Be it known that I, ALFRED O. TATE, a subject of the King of Great Britain, residing at New York, borough of Manhattan, county and State of New York, have made a new and useful Invention in Apparatus for Treating Liquids Electrolytically, of which the following is a specification.

My invention is directed particularly to novel means for decomposing electrolytic solutions, and it has for its objects, first, to effect such result with as little expenditure of energy as possible; and, second, to effect the electrolysis of solutions, such as water, in comparatively large volumes as speedily as possible.

Prior to my invention it has been the practice in effecting the electrolytic decomposition of electrolytes to connect in multiple relation a series of positive and a series of negative electrodes of relatively large area and good conductivity, the same being in the nature of plates, the series of negative electrodes being interposed between the positive electrodes in such manner that the electrolyzing current was caused to flow from each positive electrode through a volume of water located between it and the corresponding negative electrode, the upper ends of both sets of electrodes being connected together in multiple respectively with the positive and negative poles of the electrical generator. Such an arrangement, however, owing to the total internal resistance of the volume or volumes of water acted upon, and to the manner of connecting both sets of electrodes to the generator at their upper ends only, necessarily requires in practice the use of an electrical generator of relatively large electromotive force so that where it is desired to electrolyze large volumes of water the cost of the watt-energy absorbed becomes prohibitive; as, for instance, in connection with plants where it is desired to remove from water such substances as produce deleterious or objectionable results in connection with steam boilers and the like.

My invention contemplates the construction and use of apparatus whereby the total watt energy in such cases is reduced to such an extent as to make possible and practical the use of large plants of this nature. I accomplish this result by so disposing the positive and negative electrodes or anodes and cathodes of an electrolytic cell that there is comparatively little resistance offered to the flow of the current through the solution to be acted upon and in such manner that relatively very low voltage generators may be utilized, thereby materially decreasing the absorbing watt-energy of the system. I so arrange the positive and negative electrodes or the anodes and cathodes in a cell as to create upon one or both of their lateral edges or faces what I term an electrolytic field having a very large number of relatively closely located conducting surfaces of large conductivity, so disposed that the total effect of the current upon the entire surface or surfaces causes the desired result, and I so connect the series of positive electrodes or anodes and the series of negative electrodes or cathodes to the positive and negative poles of an electrical generator as to give a more uniform distribution of the current to the electrolyte to be acted upon than has heretofore been possible. This I effect by connecting the opposite ends of both sets of electrodes in multiple relation with the positive and negative poles of the source of electrical energy.

My invention will be fully understood by referring to the accompanying drawings, in which, Figure 1 is a side elevational view of a complete electrode, part of the insulating material at the top and bottom thereof being broken away to show the end structural arrangement or the connections of the electrodes, or anodes and cathodes to the positive and negative conductors which are connected to the generator not shown. Fig. 2 is a transverse sectional view taken through the insulating supporting body of the electrode, the conducting parts thereof not being shown in this view. Fig. 3 is a similar enlarged view broken in two and the parts fore-shortened, showing also the conducting parts secured thereon. Fig. 4 is a top plan view of the left end portion of the electrode as seen looking at Fig. 1 from the top toward the bottom of the drawing. Fig. 5 is a detail perspective view illustrating the manner of connecting the ends of the electrodes about the insulating base or support. Fig. 6 is a side elevational view of a complete electrode of large size, showing the manner of connecting up a series of single electrodes in a supporting frame. Fig. 7 is a transverse sectional view taken through the supporting frame; and, Fig. 8 is a side elevational view of one row of the electrodes connected together in the manner shown in Fig. 6.

Referring now to the drawings in detail in all of which like numerals represent like parts wherever used, 1, 1, and 2, 2, represent respectively the conducting anodes and cathodes or electrodes of the cell, the anodes being made of very thin narrow strips of platinum foil, preferably 1/16 of an inch in width, .0005 thick and each about 6 inches long, and the cathodes of copper of the same relative dimensions, except perhaps they may be thicker said metal being much cheaper than platinum. These strips in both sets are secured together in pairs on the opposite faces of an insulating supporting base 5 made preferably of porcelain, marble, or some material which will resist chemical action, said base or support being provided with slight integral ridges or elevations 6, 6, (see Fig. 2) the arrangement being such that the conducting anodes and cathodes 1, 1, 2, 2, are held firmly in position around the base or support by loops 7 of copper or equivalent good conducting material attached to their opposite ends and secured, the anodes at their upper ends directly to a common cross conductor 3 and the cathodes in turn to a lower cross conductor 4, the respective sets of anodes and cathodes alternating throughout the series, as is clearly illustrated in Figs. 1 and 4. The upper set of loops 7 is secured by solder directly to the conductor 3 (see Fig. 4) while the lower intervening set of loops 7 is secured in a similar manner to the cross conductor 4. I prefer to secure the double ends of these loops 7 to the platinum anodes by means of silver solder, ordinary commercial solder being sufficient for securing the like ends of said loops to the cathodes of copper. After the parts of the entire electrodes are thus built up the opposite ends thereof are dipped in a good insulating liquid, such as asphalt, paraffin, or the like, in such manner as to effectually insulate the connected and soldered parts, as clearly illustrated by the number 13 in Figs. 1 and 6. The structure as thus described constitutes an individual electrode.

In Figs. 6, 7 and 8 I have illustrated how the same may be so combined as to constitute a multiple electrode of relatively large area. In these figures of the drawings the numeral 8 represents a rectangular frame of insulating material, such as treated wood, and the numerals 9 and 10 represent intermediate treated wooden crossing strips held together and to the frame in such manner as to constitute a support for the individual electrodes, said electrodes being joined together electrically at their upper sides and to the plus pole of the electrical generator and again joined together at their lower sides and to the minus pole of the generator and all secured in place within the individual rectangular supporting parts of the frame by wooden or similar insulating cleats 11, 11 and screws 12, the entire arrangement being such that when all of the positive conductors 3 are connected to a bus-wire and all of the negative conductors 4 to a similar bus-wire, both of said bus-wires may be connected to an electrical generator of large current generating capacity and relatively low voltage.

The operation of this type of electrode, either when used singly, as illustrated in Fig. 1, or when combined as shown in Figs. 6 and 8, is as follows—The current flows from the generator through the bus-wires and positive conductors 3, 3, 3, etc. to the anode conductors 1, 1 located upon the non-conducting base 5 of the electrode; it then flows from both sets of anode conductors 1, 1 on opposite sides of the base in planes parallel with the exposed faces of the anodes and cathodes of the electrode through the very small volumes of water in each instance, located between each individual anode and the corresponding cathode, so as to thus set up on the double face of the electrode what I term an electrolytic field of relatively low voltage and great quantity of current, thereby causing rapid electrolytic action.

I prefer to use platinum for the anode conductors in this type of apparatus for the reason that this metal is not acted upon, as is well known, either electrically or chemically, in such manner as to disintegrate it, thus making the electrode practically indestructible, but I do not limit my invention to the use of this particular type of conductor, as any good conducting material such as aluminium, copper, silver, or carbon may be used. Nor do I limit my invention to the especial structural arrangement of the anodes and cathodes illustrated in the accompanying drawings, as these features may be departed from and still come within the scope of my most generic claims hereinafter made. To illustrate, instead of arranging the anodes and cathodes in the specific manner shown in the drawings I may utilize good conducting strips, sheets or bars located side by side and insulated from each other in each instance by an insulating medium of relatively thin structure, the effective lateral edges or faces of such anodes and cathodes constituting the electrolytic field or fields hereinbefore referred to, such a structural apparatus being described and shown in a co-pending application for a patent bearing Serial No. 226,303, filed Sept. 18th, 1904, allowed, forfeited, and afterward renewed by me on the 23rd day of November, 1906, and bearing Serial No. 344,787.

A still further modified structural arrangement coming within the terms of my most generic claims might be constructed in which carbon plates, such as is known in the art as "Acheson graphitized carbon" may be used, such plates being of relatively large area and having, therefore, good conductivity and might be placed edge to edge in an electrolytic solution and the edges either separated from each other by thin strata of an insulating medium or not as desired, said electrodes being connected alternately at their upper and lower ends to the positive and negative poles of the generator, such an arrangement obviously coming within the terms of my most generic claims.

In the use of all apparatus known to me for treating liquids electrolytically the current, as hereinbefore stated, is caused to flow through the entire volume of the solution located between each anode and its opposing cathode and the ions therefore travel through the entire solution and are segregated at the electrodes. My invention differs from what has previously been done, in that by locating the anodes and cathodes on the face of an insulating frame or support I am enabled to bring said parts into such close mechanical and electrical relation that a minimum resistance is offered to the current flow and the current effect is, therefore, confined to the ions in the immediate vicinity. The ions throughout the solution are brought into the electrolytic field through the action of gravity as contradistinguished from the attractive action of a current passing directly through the entire volume of a solution between opposing anodes and cathodes. This action of gravity in the use of my invention is obtained through the displacement of that layer of the solution which lies against the face of the electrode, which layer becomes lighter than the body of liquid immediately behind it because of the precipitation of the matter originally held by it in solution. This action of displacement is reinforced by the circulation of the liquid induced by the action of the gases generated in the electrolytic field.

Having thus described my invention what I claim and desire to secure by Letters Patent of the United States is—

1. An electrode for an electrolytic cell embracing alternating sets of thin or strip-like conductors supported by a single insulating base, one set constituting a multiple anode and the other a multiple cathode, substantially as described.

2. An electrode for an electrolytic cell embracing alternating sets of thin strip-like conductors supported by a single insulating base, one set constituting a multiple anode and the other a multiple cathode, substantially as described.

3. An electrode for an electrolytic cell having the anode composed of one or more thin strips of platinum secured to an insulating base and the cathode of other conducting material secured to the same base and electrically insulated from the anode, substantially as described.

4. An electrode for an electrolytic cell embracing an insulating supporting base and a series of anode conductors of thin strips of platinum secured thereto; in combination with a series of conducting cathodes also secured to the base and electrically insulated from the anodes, substantially as described.

5. An electrode for an electrolytic cell embracing a supporting frame and a series of individual electrodes composed of independent anodes and cathodes supported in said frame, the arrangement being such that anyone of said series of independent electrodes may be removed or replaced, substantially as described.

6. An electrode for an electrolytic cell embracing a supporting frame having means for supporting a series of independent or unitary electrodes, and additional means for connecting said electrodes together in any desired relation, the arrangement being such that anyone of the unitary electrodes may be removed or replaced, substantially as described.

7. An electrode for an electrolytic cell embracing a supporting frame provided with individual supports for a series of independent or unitary electrodes having anodes and cathodes, and circuit connections such that any desired number of unitary electrodes may be placed in the frame and connected in circuit, substantially as described.

8. An electrode for an electrolytic cell embracing an insulating supporting frame and intermediate crossing strips constituting supports for individual or unitary electrodes; in combination with a series of individual or unitary electrodes embracing anodes and cathodes and circuit connections such that any desired number of such individual electrodes may be connected together, substantially as described.

9. An electrode for an electrolytic cell embracing an insulating supporting frame; a series of intermediate cross strips constituting supports for individual or unitary electrodes; in combination with such individual electrodes embracing each a series of anodes and a series of cathodes supported by the insulating base, the anodes all being connected together at one side of the electrode, and the cathodes correspondingly connected at the other side thereof; substantially as described.

10. An electrode for an electrolytic cell embracing an insulating base having alternating sets of conductors secured to its face and means at the opposite ends of said conductors for connecting them, the conductors, to the positive and negative poles of an electrical generator, substantially as described.

11. An electrode for an electrolytic cell embracing an insulating base provided with ridges or elevations on its opposite faces and intervening sets of conductors located between said ridges, one set of said conductors being provided with means for connecting them to the positive pole of an electrical generator and the other set with similar means for connecting them to the negative pole thereof, substantially as described.

12. An electrode for an electrolytic cell composed of two series of thin narrow strips of conducting material secured to an insulating base or frame, one set constituting a multiple anode and the other a multiple cathode, substantially as described.

13. An electrode for an electrolytic cell embracing a multiple series of strips of platinum constituting the anode and a like multiple series of strips of other conducting material constituting the cathode, all of said strips being secured to a common base or support.

In testimony whereof I have signed my name to this specification in the presence of two subscribing witnesses.

ALFRED O. TATE.

Witnesses:
C. J. KINTNER,
M. F. KEATING.